(12) United States Patent
Ueno et al.

(10) Patent No.: US 7,369,622 B2
(45) Date of Patent: May 6, 2008

(54) DIVERSITY CIRCUIT DEMODULATING OFDM-METHOD SIGNALS AND DIVERSITY RECEIVING APPARATUS HAVING SAID DIVERSITY CIRCUIT THEREIN

(75) Inventors: Nobufumi Ueno, Hirakata (JP);
Toshiya Iwasaki, Osaka (JP);
Masayuki Yoshinaga, Kadoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 774 days.

(21) Appl. No.: 10/395,068

(22) Filed: Mar. 25, 2003

(65) Prior Publication Data

US 2003/0185320 A1    Oct. 2, 2003

(30) Foreign Application Priority Data

Mar. 25, 2002   (JP)   .............................. 2002-084282

(51) Int. Cl.
*H04B 7/02* (2006.01)
*H04B 7/10* (2006.01)

(52) U.S. Cl. ........................................ 375/267; 375/347
(58) Field of Classification Search ................ 375/267, 375/347, 260; 455/139
See application file for complete search history.

(56) References Cited

U.S. PATENT DOCUMENTS

| | | | | |
|---|---|---|---|---|
| 5,088,113 A | * | 2/1992 | Wei .............................. | 375/280 |
| 5,265,122 A | * | 11/1993 | Rasky et al. ................. | 375/346 |
| 5,455,844 A | * | 10/1995 | Ishikawa et al. ............ | 375/232 |
| 5,844,907 A | * | 12/1998 | Uchiki et al. ................ | 370/517 |
| 5,949,796 A | * | 9/1999 | Kumar ......................... | 370/529 |
| 6,374,385 B1 | * | 4/2002 | Hamalainen et al. ........ | 714/786 |
| 6,549,561 B2 | * | 4/2003 | Crawford ..................... | 375/137 |
| 6,654,431 B1 | * | 11/2003 | Barton et al. ................ | 375/346 |
| 6,975,608 B1 | * | 12/2005 | Park et al. ................... | 370/332 |
| 7,016,426 B1 | * | 3/2006 | Balz et al. ................... | 375/261 |
| 7,054,377 B1 | * | 5/2006 | Betts ............................ | 375/265 |
| 2001/0042250 A1 | * | 11/2001 | Ishii ............................. | 725/46 |
| 2001/0050926 A1 | * | 12/2001 | Kumar ......................... | 370/529 |
| 2002/0010896 A1 | * | 1/2002 | Huttunen ..................... | 714/796 |
| 2002/0057661 A1 | * | 5/2002 | Raith ........................... | 370/337 |
| 2003/0043928 A1 | * | 3/2003 | Ling et al. ................... | 375/267 |
| 2003/0072395 A1 | * | 4/2003 | Jia et al. ...................... | 375/341 |
| 2004/0184399 A1 | * | 9/2004 | Chiou .......................... | 370/206 |

OTHER PUBLICATIONS

Dispatch No. 095276; Notification for Reason(s) for Refusal; Patent Application No. 2002-084282; Mar. 15, 2005.

* cited by examiner

*Primary Examiner*—Don N Vo
(74) *Attorney, Agent, or Firm*—McDermott Will & Emery LLP (57) ABSTRACT

In a receiving apparatus, two respective reference-point computing units in respective diversity branches calculate reference points on a constellation, and two respective reference-point specifying units in the two diversity branches select respectively the reference points closest to the received data. A diversity circuit receive from the two diversity branches the information specifying the received data and the reference points, and a comparison processing unit compares these reference points. If these reference points are matched, a selection combining unit outputs the reference point while, if not matched, any one of received data selected at random is outputted.

6 Claims, 12 Drawing Sheets

FIG. 1

A0, B0 : SINCE THE SAME REFERENCE POINT IS SELECTED,
         THIS REFERENCE POINT IS TO BE OUTPUTTED.
A1, B1 : SINCE DIFFERENT REFERENCE POINTS ARE SELECTED,
         SELECTION COMBINING OR RANDOM OUTPUT ACCORDING
         TO RELIABILITY INFORMATION IS TO BE EFFECTED.

QPSK

FIG. 4
(PRIOR ART)

16QAM

FIG. 5
(PRIOR ART)

64QAM

FIG. 6

| RELIABILITY INFORMATION SIGNAL (3 BITS) | | RELIABILITY JUDGMENT OF PILOT SIGNAL |
|---|---|---|
| MOST SIGNIF-ICANT BIT | LOW-ORDER 2 BITS | |
| 1 | x x | NOT RELIABLE (LOST) |
| 0 | 11 | RELIABLE (NO CORRECTION) |
| 0 | 10 | CORRECTION NEEDED ((ABSOLUTE VALUE OF DEVIATION)+1) |
| 0 | 01 | CORRECTION NEEDED ((ABSOLUTE VALUE OF DEVIATION)+2) |
| 0 | 00 | CORRECTION NEEDED ((ABSOLUTE VALUE OF DEVIATION)+3) |

| MODU-LATION METHOD | REFERENCE VALUE N | CALCULATION EQUATION (A : PILOT AVERAGE VALUE) |
|---|---|---|
| DQPSK | ±1 | $A \times N \div \sqrt{2}$ |
| QPSK | ±1 | $A \times N \div \sqrt{2}$ |
| 16QAM | ±1, ±3 | $A \times N \div \sqrt{10}$ |
| 64QAM | ±1, ±3, ±5, ±7 | $A \times N \div \sqrt{42}$ |

DIVERSITY CIRCUIT DEMODULATING OFDM-METHOD SIGNALS AND DIVERSITY RECEIVING APPARATUS HAVING SAID DIVERSITY CIRCUIT THEREIN

BACKGROUND OF THE INVENTION

1. Field of the Invention

The present invention relates to digital signal receiving apparatus which receive and demodulate digital modulated signals, and it particularly relates to a digital signal receiving apparatus which has the functions of receiving and demodulating signals modulated by the OFDM (Orthogonal Frequency Division Multiplexing) method used in the digital terrestrial broadcasting and so forth and of diversity combining for portable reception and mobile reception.

2. Description of the Related Art

OFDM method, as a modulation scheme superior in realizing high-quality transmission and improving the frequency utilization efficiency, has in recent years been proposed for systems that transmit image signals or sound signals. In OFDM method, a multiplicity of subcarriers are placed within the band of a single channel. It is highly resistant to interferences caused by ghosts or multipath and therefore enables excellent mobile reception. There are four kinds of modulation by the OFDM method, namely, DQPSK (Differential Quadrature Phase Shift Keying), QPSK, 16 QAM (Quadrature Amplitude Modulation) and 64 QAM, which have each a different mapping method. Also, these modulation methods, of which DQPSK is called a differential modulation method and the others synchronous modulation methods, differ from one another in the type and placement position of a pilot carrier to be inserted in the OFDM symbol.

On the transmission side of an OFDM method, a modulation processing that includes mapping, time interleaving and frequency interleaving by various modulation methods is performed on signals compressed into an MPEG method. On the demodulation side of the OFDM method, a demodulation processing is basically carried out in a sequence completely opposite to the processing on the transmission side. Namely, demodulation processings corresponding to the above-mentioned three kinds of processing are carried out in the order of frequency deinterleaving, time deinterleaving and demapping.

In mobile reception, transmitted radio waves come under the influence of fading, so that the received power fluctuates significantly, thereby making it difficult to maintain high-quality transmission. A technique called diversity reception is one for reducing quality degradation that may be caused by fading. In this technique, a plurality of independent signals are received and the fading fluctuation is reduced by using such signals properly to realize a high-quality transmission. This technique of reducing fading fluctuation is called the diversity combining method, which comes in three basic types, namely, selection combining, equal-gain combining and maximum-ratio combining. In the selection combining, in particular, the least degraded signal is selected and outputted from a plurality of received signals, and the other signals are not used. The selection combining is considered to best serve a practical purpose because the circuit structure of this selection combining is simpler than those of the other two combining methods.

Now, if a selection combining processing is carried out, one least degraded data is selected and outputted from a plurality of data. When this data has a deviation from the reference point on the constellation, a Viterbi decoding is performed in such a way as to include the magnitude of the deviation. Hence, a problem arises in which errors get accumulated in the metric computation when a soft-decision Viterbi decoding is performed.

SUMMARY OF THE INVENTION

The present invention has been made in view of the foregoing circumstances and an object thereof is to improve an error correction performance in the reception of digital signals. Another object of the present invention is to relieve the data selection or decoding processing in the signal reception using a diversity method. Still another object of the present invention is to raise the reliability of data as a whole by erasing data whose reliability is unknown.

A preferred embodiment according to the present invention relates to a diversity circuit. This diversity circuit includes: a comparison processing unit which acquires, from each of diversity branches, selection information by which to select a reference point on a constellation closest to received data, and which compares the selection information; and a selection combining unit which, when a most frequently selected reference point is uniquely determined by a plurality of selection information, outputs data indicating the reference point. The phrase "a most frequently selected reference point is uniquely determined" includes not only a case, for example, when all the reference points coincide, but also a case when the reference point is determined by the principle of majority rule in diversity of three or more branches.

Another preferred embodiment according to the present invention relates to a diversity receiving apparatus. This diversity receiving apparatus comprises: a diversity circuit as described above; and a demodulation processing unit which selects, for each of the diversity branches, a reference point on a constellation closest to the received data.

By implementing these above-described structures, error does not occur in the metric computation at the soft-decision Viterbi decoding processing when the reference point itself is selected as an output. Moreover, the error correcting capability of the soft-decision Viterbi decoding processing is improved overall. Moreover, the processing load of selection and decoding is reduced.

It is to be noted that any arbitrary combination of the above-described structural components, and expressions converted or substituted between a method, an apparatus, a computer program, a recording medium storing the computer programs, a data structure and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

Figure 1:
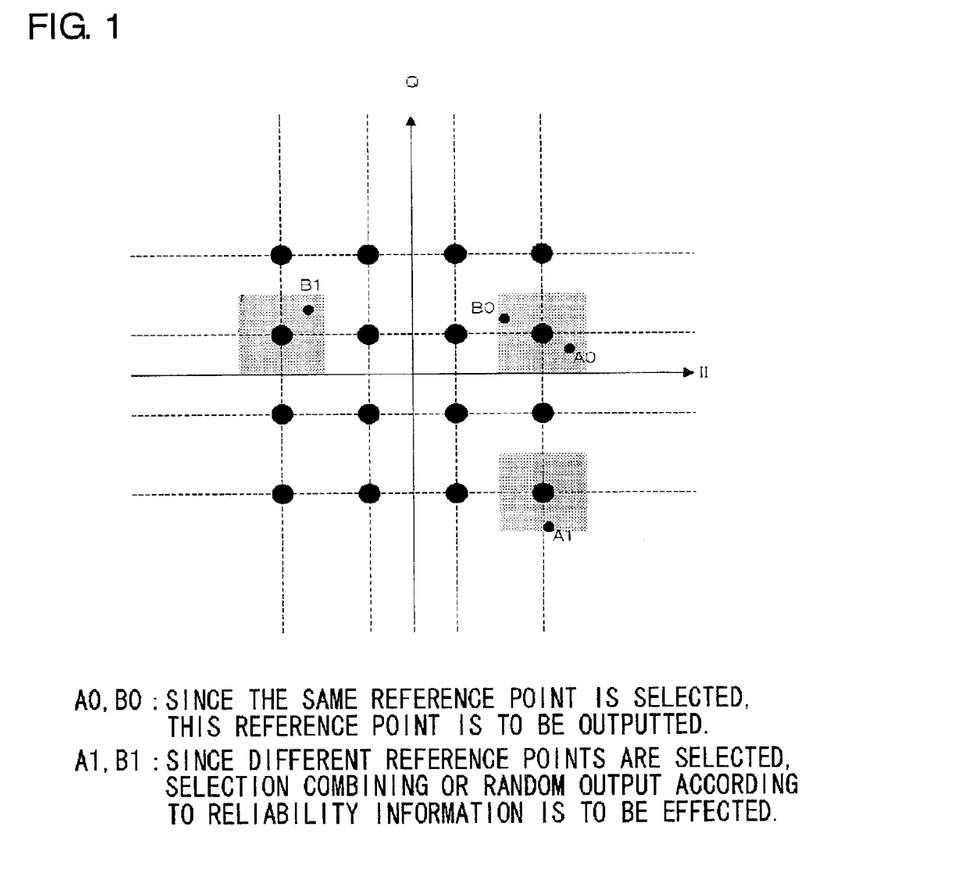
FIG. 1 shows an example of a diversity combining processing when a modulation scheme employed is 16 QAM.

In preferred embodiments of the present invention, when a plurality of received data acquired by a diversity method have all reference points, on a constellation, closest thereto in agreement with one another, the reference point in agreement will be outputted. When not all the reference points are in agreement with one another, a reference point having been selected most frequently is outputted. And where a single reference point having been selected most frequently can not be decided, the heights of reliability information added to data are compared and the most reliable data is selected and outputted provided that the structure has reliability detection processing means in each branch thereof. When the reliability information does not lead to a decision or when there is no reliability information added, however, one of input data will be selected at random and outputted. FIG. 1 shows an example of this diversity combining processing when the modulation scheme employed is 16 QAM.

The preferred embodiments of the present invention are roughly classified into two types of diversity combining, namely, one in a circuit structure employing demapping processing and the other in a circuit structure employing pre-demapping processing. Before these preferred embodiments are described, demapping processing, pre-demapping processing and reliability detection processing will be first described as techniques prerequisite thereto.

Figure 2:
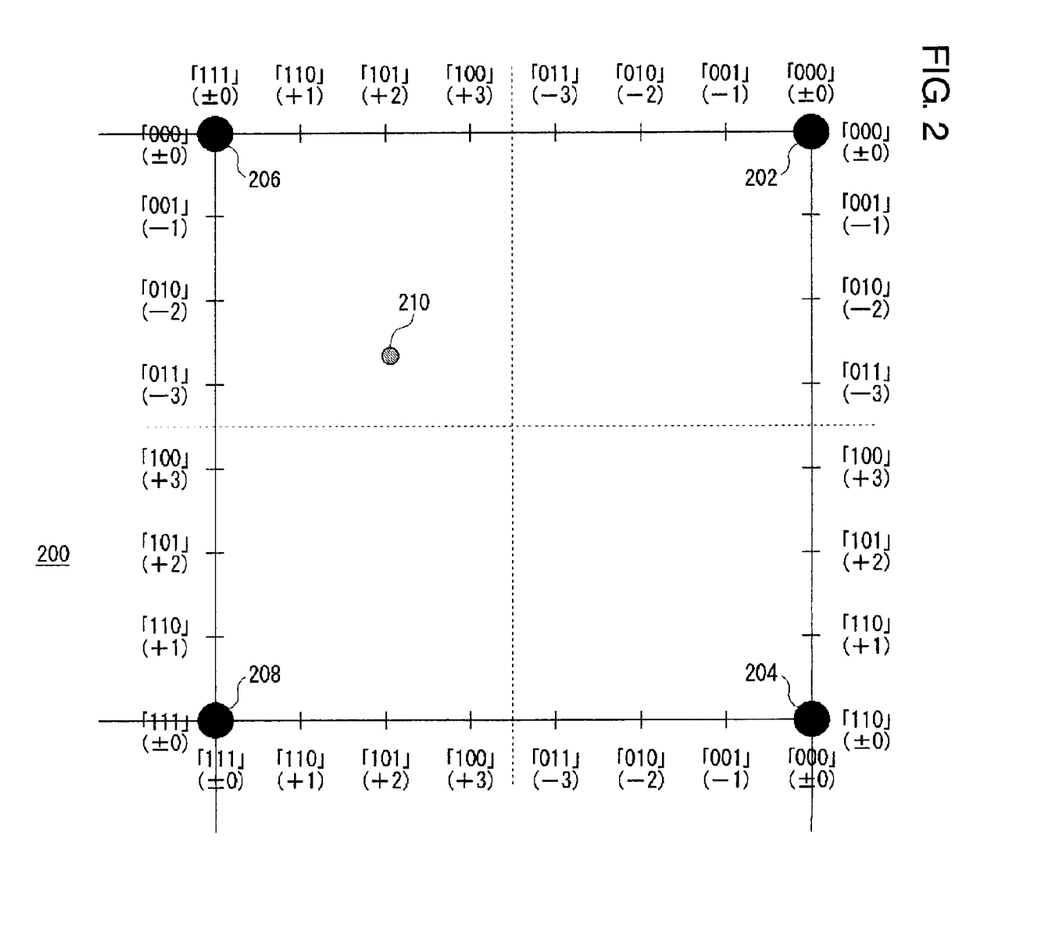
FIG. 2 shows reference points on a constellation and degrees of deviation therefrom.

Demapping Processing FIG. 2 shows reference points on a constellation and degrees of deviation therefrom. The constellation 200 shown in FIG. 2 includes first to fourth reference points 202, 204, 206 and 208. In a demapping processing, reference points on a constellation are first obtained according to respective modulation methods employed, then the closest reference point is selected for each received data and the information specifying the reference point is expressed in bit data of a maximum of 6 bits. Then, the bit data, with each bit thereof extended to 3 bits, are extended to a maximum total of 18 (3×6) bits. To put it concretely, each bit is expressed as 111, 110, 101, 100, 011, 010, 001, 000 from one most certain to be "1" to one most certain to be "0" according to the degree of deviation of received data from the reference point closest thereto.

Figure 3:
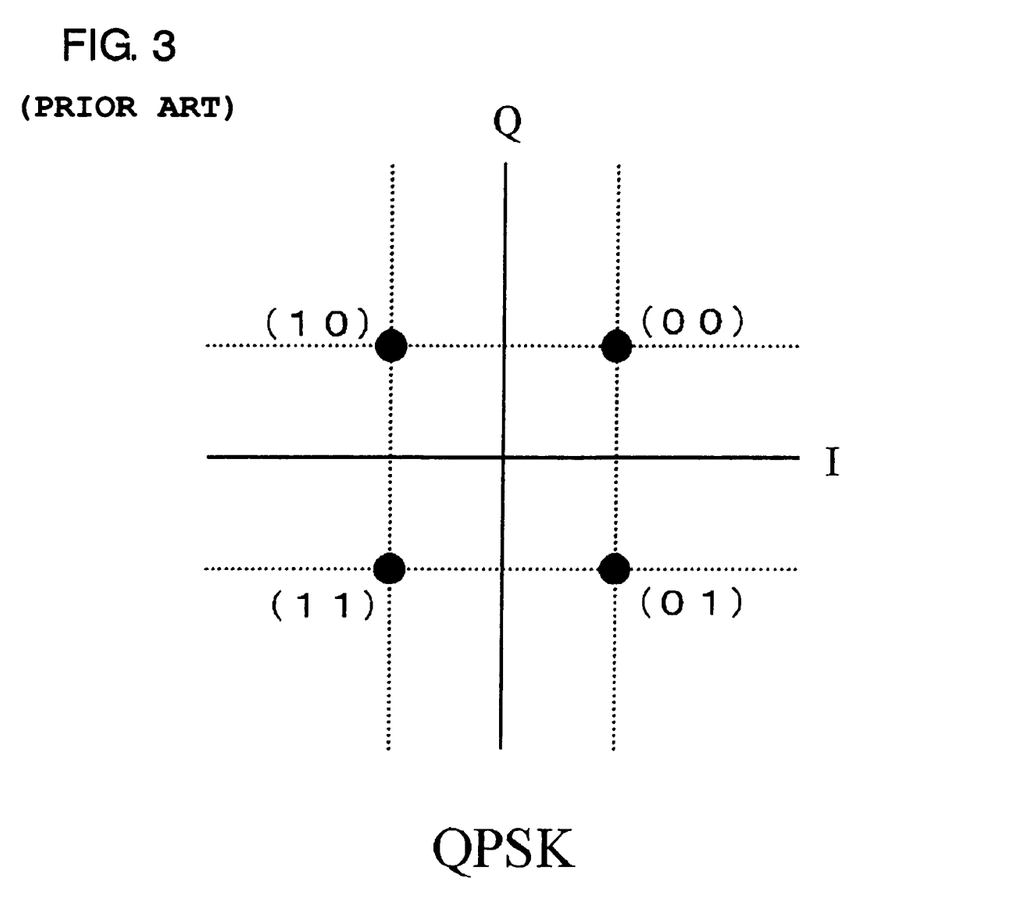
FIG. 3 shows a constellation in QPSK.
Figure 4:
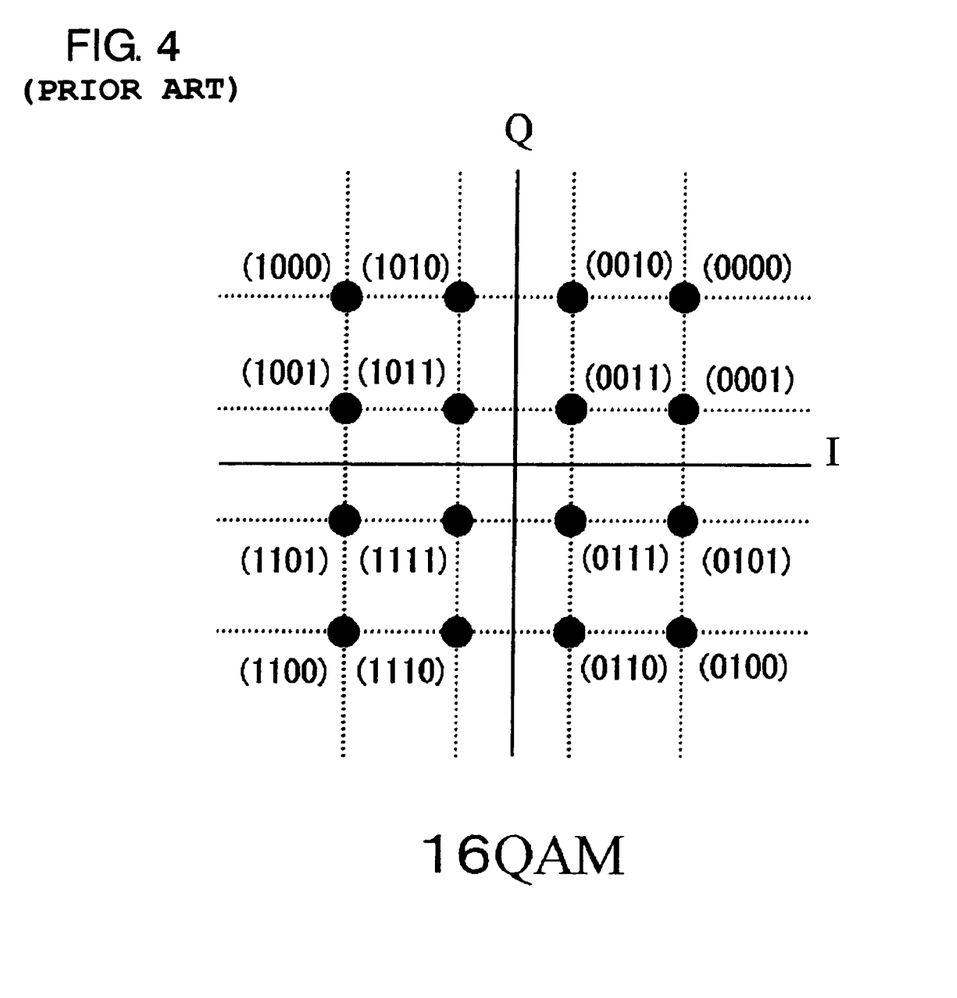
FIG. 4 shows a constellation in 16 QAM.
Figure 5:
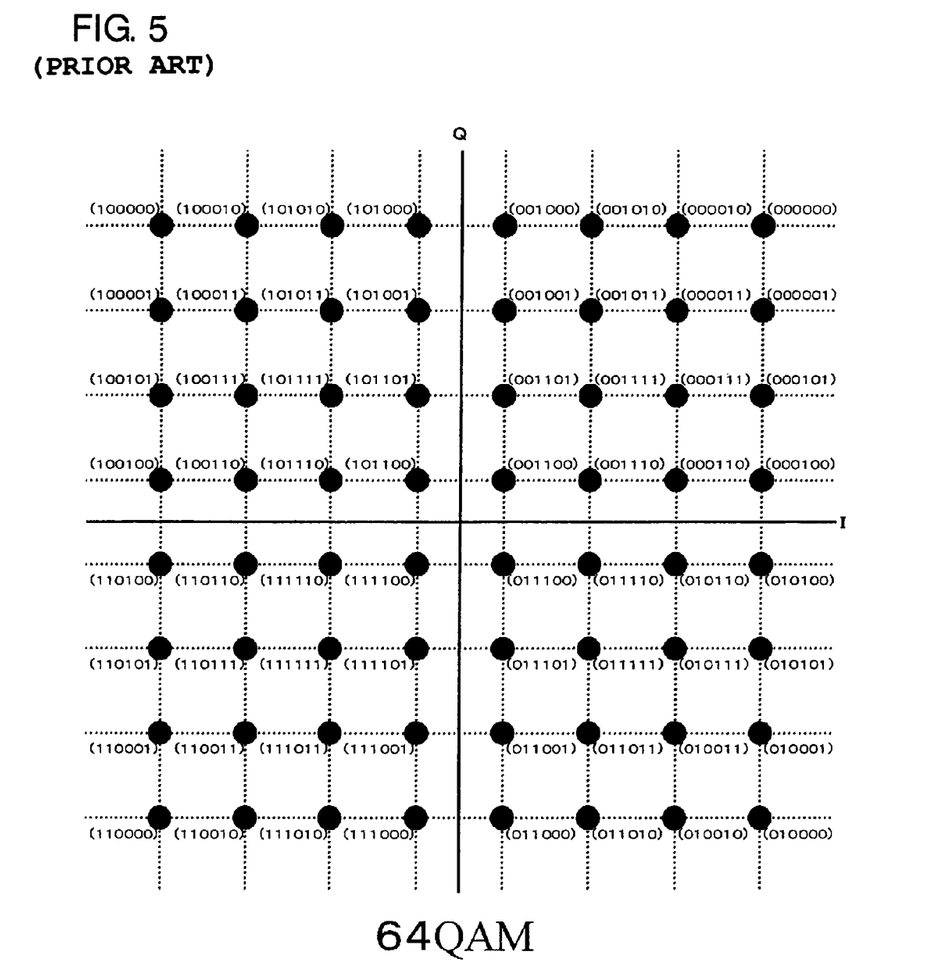
FIG. 5 shows a constellation in 64 QAM.

For example, a point 210 is the closest to the third reference point 206 of the four reference points and has an uncertainty of about +2 in the I-axis direction and about −3 in the Q-axis direction. In the demapping processing, this point 210 is expressed as an 18-bit data of "000,000,000, 000,101,011." It is to be noted that the mapping of a constellation for QPSK is such as shown in FIG. 3, that for 16 QAM is such as shown in FIG. 4 and that for 64 QAM is such as shown in FIG. 5.

Pre-Demapping Processing

In connection with the aforementioned three kinds of demodulation processing, namely, frequency deinterleaving, time deinterleaving and demapping, a method in which the order of processing is changed and the demapping is done before the other processings was proposed in the Japanese Patent Application Laid-Open No. 2001-320345. Carrying out a demapping processing before a time deinterleaving or frequency deinterleaving processing is called a pre-demapping processing. In the pre-demapping processing, data to be generated are different from ordinary demapping data. That is, pre-demapping data, which include first data indicating reference points on a constellation corresponding to a modulation technique used and second data indicating the magnitude of deviation of data from the reference points, are generated. The pre-demapping data need to be converted into demapping data after time deinterleaving, but can be expressed by a maximum total of 12 bits, which consist in a maximum of 6 bits for first data and always 6 bits for second data, in contrast to demapping data, which requires the amount of information (a maximum of 18 bits) three times the data indicating the reference points (a maximum of 6 bits). For instance, the point 210 in FIG. 2 is expressed by a 12-bit data of "000010,110,011." This has an advantage of reduced use of memory by narrowing the bit width of data by the pre-demapping processing prior to the frequency deinterleaving processing and time deinterleaving processing which require much memory.

Reliability Detection Processing

Received signals may sometimes include data whose reliability has been lowered by the adverse effects of multipath, interference or noise. Thus, attempts are made to improve the reception performance by detecting reliability information and regarding the data as being lost according to how high the reliability thereof is or by correcting the data. Two methods for detecting reliability are described hereinbelow.

Figure 6:
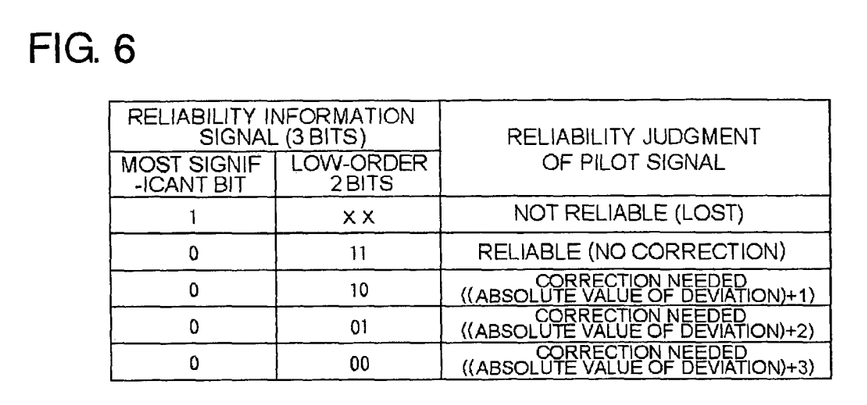
FIG. 6 is a table showing values for reliability information and their meanings.
Figure 7:
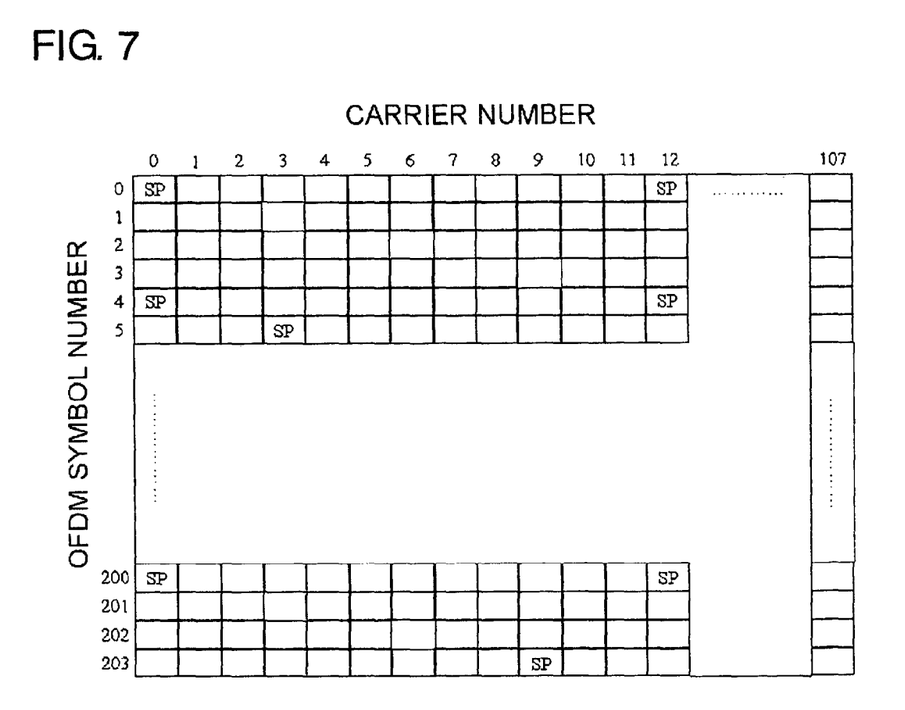
FIG. 7 shows positions where SP's are inserted.

In the first method, the height of reliability of each carrier is detected from the variance or dispersion of SP (Scattered Pilot) using SP signals among pilot signals after FFT (Fast Fourier Transform) (see "A Forward Error Correction Method for OFDM transmission Considering Terrestrial Channel Characteristics", 1998 ITE (The Institute of Image Information and Television Engineers) Annual Convention 3-1). Reliability information, however, is detected in a synchronous modulation part only, because SP is contained in the synchronous modulation part only. The results of detection are outputted as a signal of about 3 bits that can be reflected in the weighting of Viterbi soft-decision, as shown in FIG. 6. As in the case with the carriers of data signals, this reliability detection is performed also for the carriers of the pilot signal. It is to be noted here that, as shown in FIG. 7, SP is inserted in the synchronous modulation part once every 12 carriers and once every 4 symbols.

In the second method, the dispersion is obtained from the magnitude of deviation of data as viewed from reference points on a constellation, and the height of reliability is detected from this dispersion (see "A Forward Error Correction Method for OFDM transmission Considering Terrestrial Channel Characteristics", 1998 ITE (The Institute of Image Information and Television Engineers) Annual Convention 3-2). Similar to the first method, the results of detection are outputted as a signal of about 3 bits that can be reflected in the weighting of Viterbi soft-decision, as shown in FIG. 6.

After demapping, reliability decision processing and correction processing are carried out, thus reflecting the reliability information in the demapping data. That is, if a predetermined one-bit data of reliability information indicates "data loss", the demapping data is judged to be lost and then "0" is outputted. If the indication is not "data loss", the reliability is judged from data of about two predetermined bits of reliability information, and the data is outputted after making a correction to the magnitude of deviation of received data from reference points, wherein the correction thus made is proportional to how low the reliability is.

First Embodiment

Figure 8:
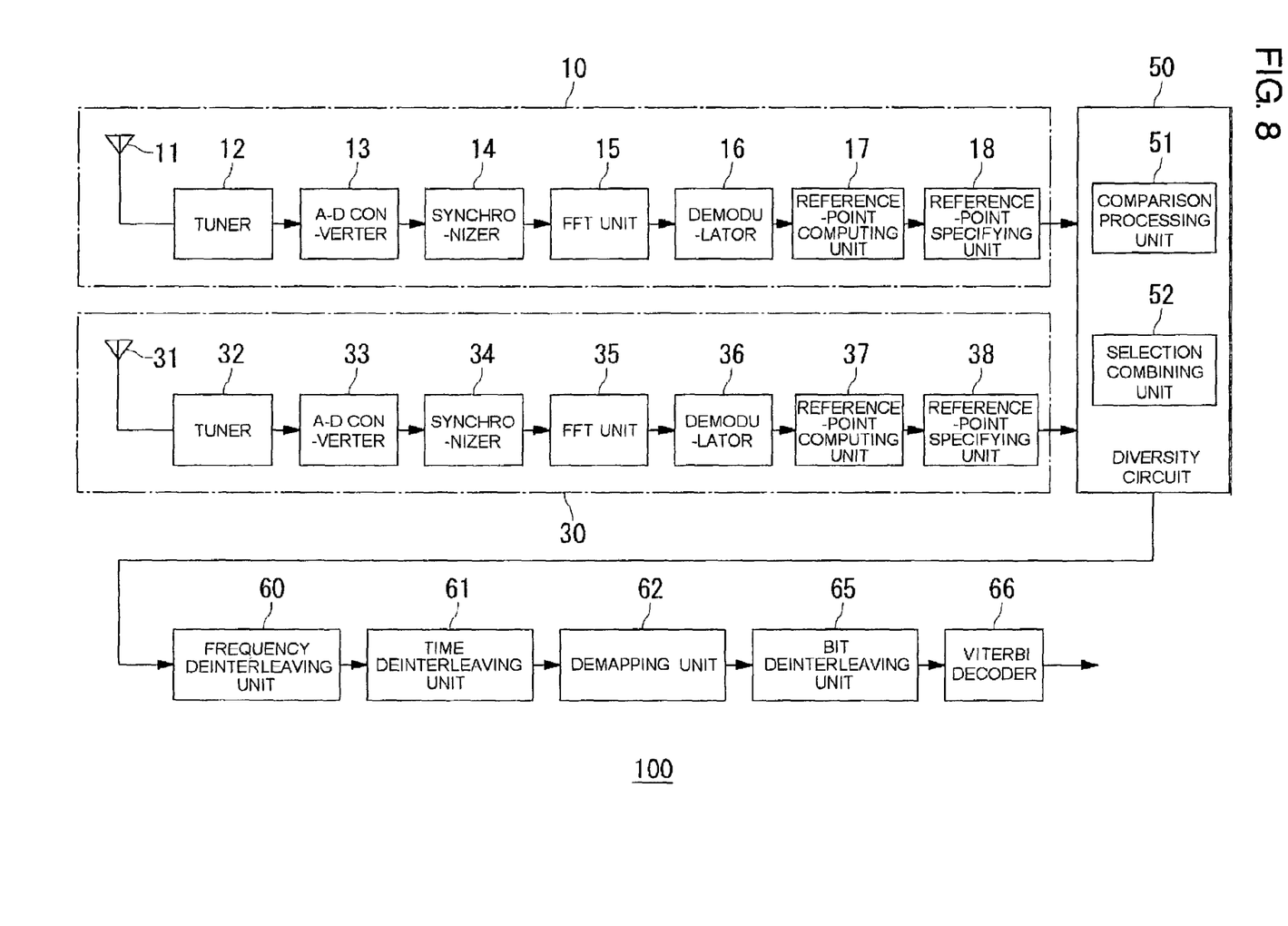
FIG. 8 shows a circuit structure of a receiving apparatus according to first and second embodiments.

FIG. 8 shows a circuit structure of a receiving apparatus 100 according to a first embodiment which employs a demapping processing. The receiving apparatus 100 is comprised of two systems of demodulation processing circuits, and a diversity circuit. A first branch 10 includes a first antenna 11, a first tuner 12, a first analog-to-digital converter 13, a first synchronizer 14, a first FFT unit 15 and a first demodulator 16.

The first tuner 12 receives an RF signal modulated by an OFDM modulation method via the first antenna 11 and down-converts the modulated RF signal to a base band signal. The first A-D converter 13 converts analog signals to digital signals and at the same time generates signals of real-axis (I-axis) component and signals of imaginary-axis (Q-axis) component, using a Hilbert transform or the like. The first synchronizer 14 performs a synchronizing processing and the first FFT unit 15 performs a fast Fourier transform, thus converting time-base data into frequency-base data. The first demodulator 16 performs various demodulation processings, including differential demodulation corresponding to a modulation scheme used then.

Figure 9:
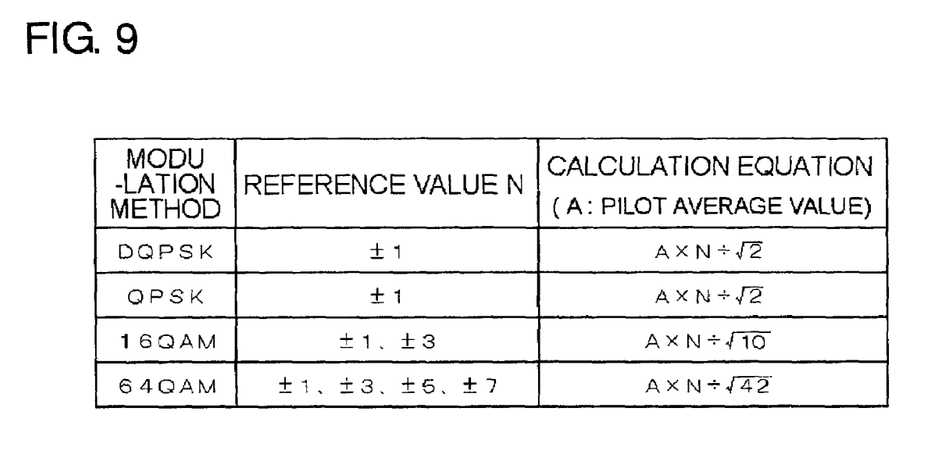
FIG. 9 is a table showing equations for calculating demapping reference points

The first branch 10 further includes a first reference-point computing unit 17 and a first reference-point specifying unit 18. The first reference-point computing unit 17 obtains a reference point for demapping according to each of the modulation methods used. The reference point can be obtained by level-converting the average value of pilot signals and multiplying it by a coefficient for calculating a reference point defined for each modulation method as shown in FIG. 9. Since pilot signals are made to be 4/3 times larger than data signals on the modulation side, the pilot signals are multiplied by 3/4 so as to convert the pilot average value to the level of data signals. Moreover, the minimum reference point for each modulation method can be obtained by multiplying the pilot signal after level conversion by $1/\sqrt{2}$ for DQPSK and QPSK, that by $1/\sqrt{10}$ for 16 QAM, and that by $1/\sqrt{42}$ for 64 QAM, respectively. In other words, the reference point for demapping is obtained by multiplying the pilot average by a constant value.

The first reference-point specifying unit 18 selects for each carrier a reference point on the constellation for each modulation method to which the inputted frequency-base data is the closest. Then the first reference-point specifying unit 18 outputs selection information specifying the selected reference point, together with the inputted frequency-base data.

A second branch 30 includes a second antenna 31, a second tuner 32, a second analog-to-digital converter 33, a second synchronizer 34, a second FFT unit 35, a second demodulator 36, a second reference-point computing unit 37 and a second reference-point specifying unit 38. These blocks have the same functions, respectively, as those of the blocks with the same names in the first branch 10.

A diversity circuit 50 includes a comparison processing unit 51 and a selection combining unit 52. The comparison processing unit 51 acquires the selection information specifying the reference point on a constellation closest to frequency-base data from each of the first and second branches 10 and 30 and compares them. When the closest reference points agree with each other, the selection combining unit 52 outputs data indicating the reference point. When the closest reference points differ from each other, the selection combining unit 52 selects either of the inputted frequency-base data at random and outputs it.

Data outputted from the selection combining unit 52 is subjected to the processings of a frequency deinterleaving by a frequency deinterleaving unit 60, a time deinterleaving by a time deinterleaving unit 61 and then to a demapping by a demapping unit 62, in this order. After the data is further subjected to the processing of a bit deinterleaving by a bit deinterleaving unit 65, the data is subjected to the processing of a soft-decision Viterbi decoding by a Viterbi decoder 66.

By implementing the above-described structure, error does not accumulate in the soft-decision Viterbi decoding and the processing load can be reduced when the reference points agree with each other. And even when they do not agree with each other, the processing load of selection combining can be reduced.

Second Embodiment

A receiving apparatus 100 according to a second embodiment has the structure and operation in common with those of the first embodiment except for the processing by a diversity circuit 50. When the closest reference points of the two branches do not agree with each other, the diversity circuit 50 according to this second embodiment regards it as a loss of received data and outputs data indicating to the effect that the received data is lost. This structure raises the relative reliability of data as a whole by erasing data of unknown reliability.

Third Embodiment

A receiving apparatus according to a third embodiment differs from the first and second embodiments in that it has a function of selection combining processing using reliability information.

Figure 10:
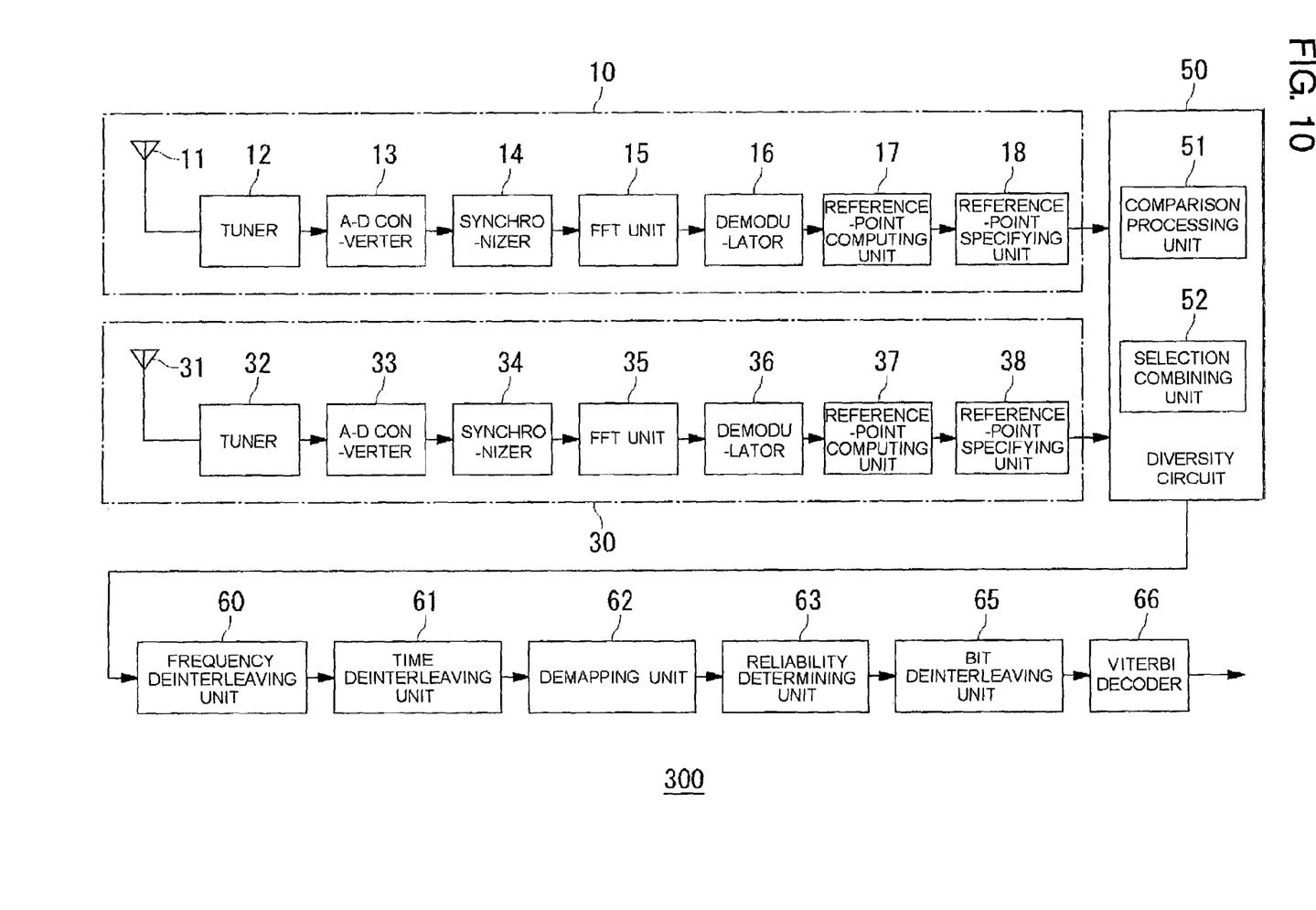
FIG. 10 shows a circuit structure of a receiving apparatus according to third and fourth embodiments.

FIG. 10 shows a circuit structure of a receiving apparatus 300 according to the third embodiment. According to this third embodiment, in the demodulation processing done at the demodulator 16, a processing of detection of reliability information using SP is carried out in parallel with such a processing as differential demodulation or SP demodulation. The reliability information thus detected is added to the frequency-base data of each carrier.

Frequency-base data added with reliability information and selection information is inputted to the diversity circuit 50 from both the first and second branches 10 and 30. The technique of selection combining is such that the reference points closest to the frequency-base data are first compared and, if they agree with each other, data indicating this reference point is outputted. If they do not agree with each other, reliability information is compared and the frequency-base data with higher reliability is selected and outputted. If a single output can not be chosen by either reference point comparison or reliability comparison, then the selection combining unit 52 selects any of the frequency-base data at random and outputs it.

A reliability determining unit 63 performs a data loss judging processing using reliability information on the data having been demapped by a demapping unit 62, and a correction processing relative to the certainty or likelihood of pre-demapping. The data obtained after this correction processing is subjected to the processing of a bit deinterleaving by a bit deinterleaving unit 65. The other processings are the same as in the first and second embodiments.

Fourth Embodiment

A receiving apparatus 300 according to a fourth embodiment has the structure and operation in common with those of the third embodiment except for the processing by a diversity circuit 50. When a single output can not be chosen by either reference point comparison or reliability comparison, the diversity circuit 50 according to this fourth embodiment regards it as a loss of received data and outputs data indicating to the effect that the received data is lost. This structure raises the reliability of data as a whole by deleting data of unknown reliability.

Fifth Embodiment

Figure 11:
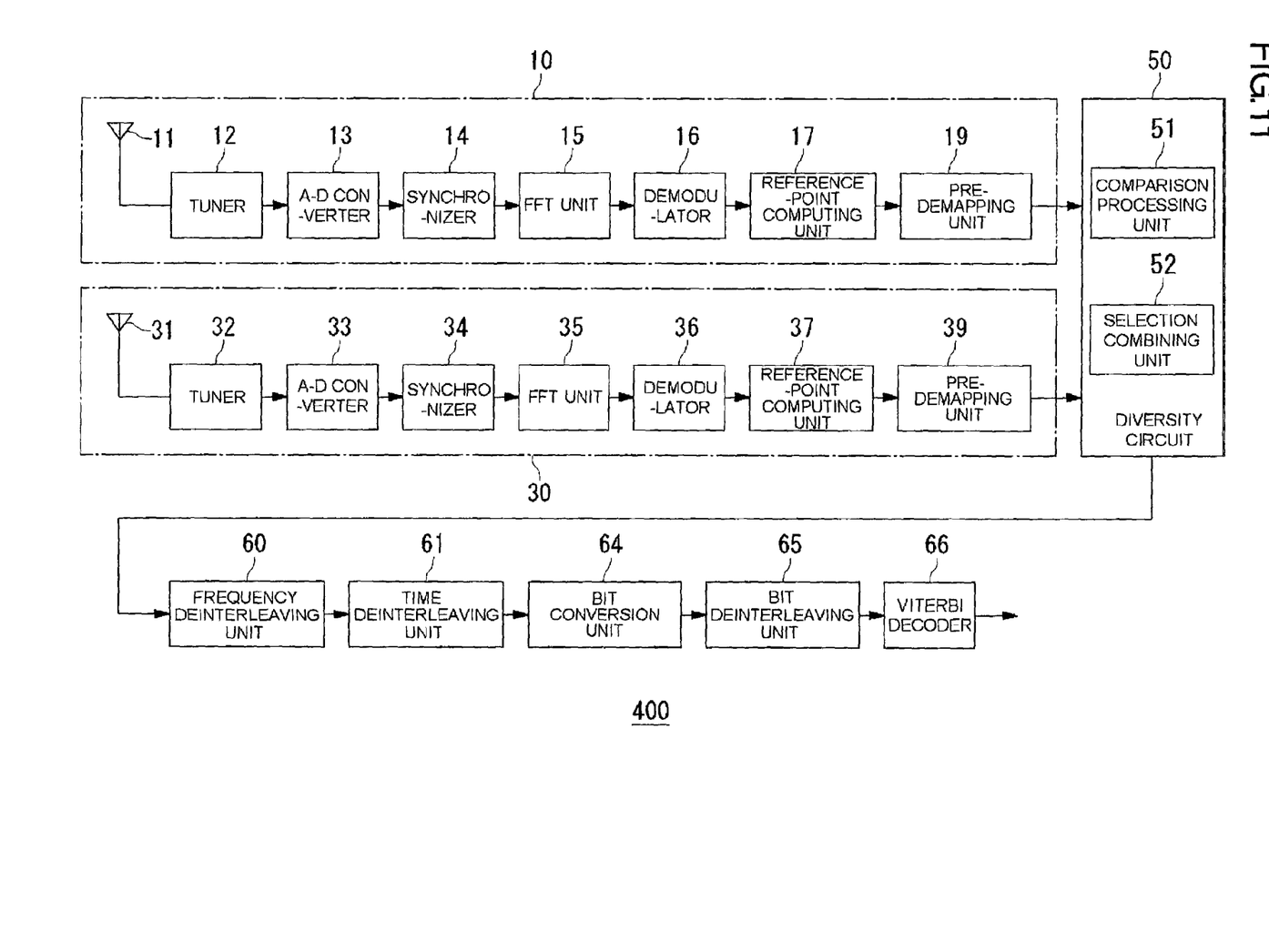
FIG. 11 shows a circuit structure of a receiving apparatus according to fifth and sixth embodiments.

FIG. 11 shows a circuit structure of a receiving apparatus 400 according to a fifth embodiment. The receiving apparatus according to this fifth embodiment differs from the first to fourth embodiments in that the reference points on a constellation are obtained by a pre-demapping processing.

The first and second branches 10 and 30 include first and second pre-demapping units 19 and 39, respectively. The first and second pre-demapping units 19 and 39 first select a reference point closest to frequency-base data. The selection information specifying this reference point is expressed by a bit data of a maximum of 6 bits. This is treated here as the first data of pre-demapping. Next, the positive or negative direction and the degree of deviation of data in the respective I-axis and Q-axis directions as seen from the selected reference point are expressed by a bit data of 6 bits for I and Q combined, which consist of 3 bits for each axis, namely, 1 bit for direction and 2 bits for the degree of deviation for each axis. The degree of deviation is to be expressed in the same units as the degree of deviation at demapping (4 levels). This is treated here as the second data of pre-demapping. The output of pre-demapping, combining the first data and the second data, is expressed by a bit data of a maximum of 12 bits.

Pre-demapping data from the two systems are inputted to a diversity circuit 50. The technique of selection combining is such that the reference points closest to the frequency-base data, which are specified by the first data of pre-demapping data, are compared and, if they agree with each other, the pre-demapping data indicating this reference point is outputted. If they do not agree with each other, any of the pre-demapping data is selected at random and outputted.

A bit conversion unit 64 converts data already time-deinterleaved, which is inputted in a pre-demapping data format of a maximum of 12 bits, into data in a demapping data format of 18 bits. The data obtained after this conversion is bit-deinterleaved by a bit deinterleaving unit 65. The other processings are the same as in the third and fourth embodiments.

The structure as described above also prevents the occurrence of errors in the metric computation at the soft-decision Viterbi decoding processing, thus improving the error correction capacity of soft-decision Viterbi decoding processing as a whole.

Sixth Embodiment

A receiving apparatus 400 according to a sixth embodiment has the structure and operation in common with those of the fifth embodiment except for the processing by a diversity circuit 50. When the closest reference points in the two branches, which are specified by the first data of pre-demapping data, do not agree with each other, the diversity circuit 50 according to this sixth embodiment regards it as a loss of received data and outputs data indicating to the effect that the received data is lost. This structure raises the reliability of data as a whole by erasing data of unknown reliability.

Seventh Embodiment

A receiving apparatus according to a seventh embodiment differs from the fifth and sixth embodiments in that a selection combining processing is performed using reliability information. The reliability information in this seventh embodiment is detected from SP.

Figure 12:
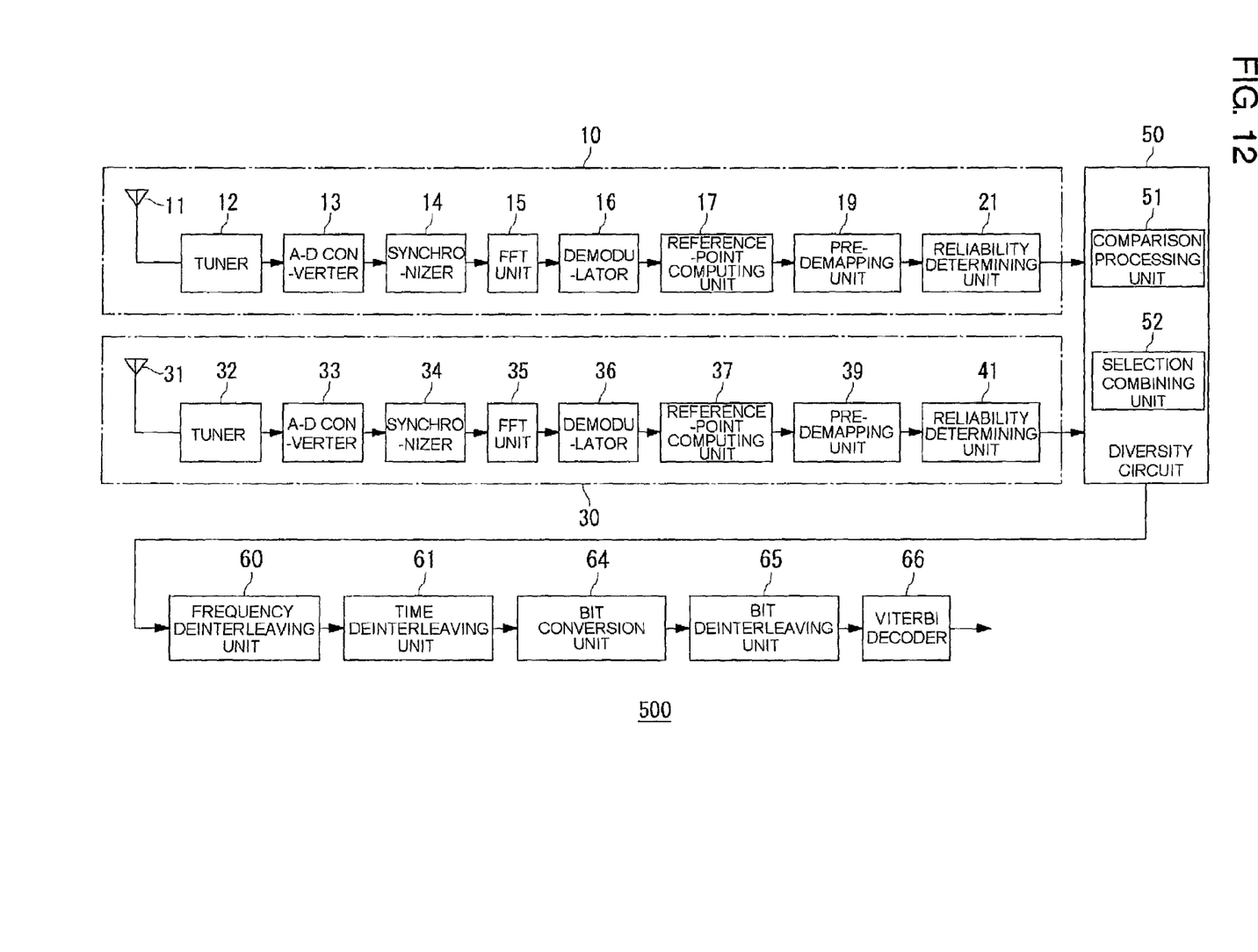
FIG. 12 shows a circuit structure of a receiving apparatus according to seventh and eighth embodiments.

FIG. 12 shows a circuit structure of a receiving apparatus 500 according to the seventh embodiment. The detection processing of reliability information by SP is the same as in the third embodiment. First and second pre-demapping units 19 and 39 generate pre-demapping data by performing a pre-demapping processing based on the reference points of demapping calculated by first and second reference-point computing units 17 and 37. First and second reliability determining units 21 and 41 make a loss decision based on the reliability information and carry out a correction on the magnitude of deviation of pre-demapping data in proportion to how low the reliability is.

The pre-demapping data, added with reliability information thereto, obtained after the reliability judgment and correction are inputted to a diversity circuit 50 from each of the two systems. The technique of selection combining is such that the reference points closest to the frequency-base data, which are specified by the first data of pre-demapping data, are first compared and, if they agree with each other, the pre-demapping data of this reference point is outputted. If they do not agree with each other, the reliability information is compared and the input pre-demapping data with higher reliability is selected and outputted. If a single output can not be chosen by either reference point comparison or reliability comparison, then any one of the input pre-demapping data is selected and outputted. The subsequent processings are the same as in the fifth and sixth embodiment.

Eighth Embodiment

A receiving apparatus 500 according to an eighth embodiment has the structure and operation in common with those in the seventh embodiment except for the processing by a diversity circuit 50. When a single output can not be chosen by either reference point comparison or reliability comparison, the diversity circuit 50 according to this eighth embodiment regards it as a loss of received data and outputs data indicating to the effect that the received data is lost. This structure raises the reliability of data as a whole by erasing data of unknown reliability.

Ninth Embodiment

A receiving apparatus according to a ninth embodiment differs from the seventh and eighth embodiments in that reliability information is detected from the dispersion or variance of deviation of pre-demapping.

Figure 13:
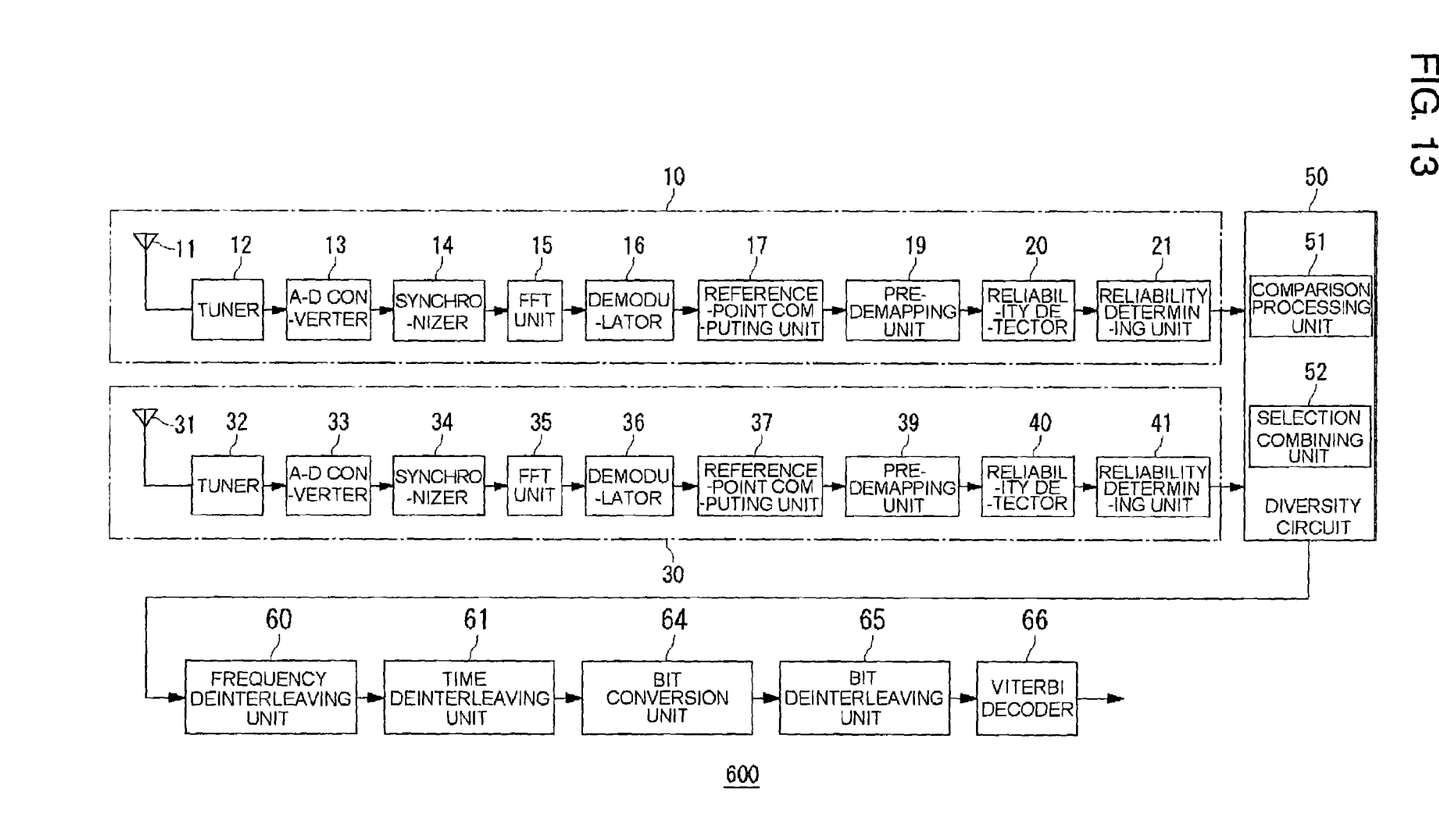
FIG. 13 shows a circuit structure of a receiving apparatus according to ninth to twelfth embodiments.

FIG. 13 shows a circuit structure of a receiving apparatus 600 according to the ninth embodiment. First and second pre-demapping units 19 and 39 generate pre-demapping data by performing a pre-demapping processing based on the reference points of demapping calculated by first and second reference-point computing units 17 and 37. A reliability detector 16 determines the dispersion of deviation by the magnitude of deviation in I and Q directions, utilizing the magnitude of deviation of data from the reference point closest to data determined by pre-demapping, and detects the reliability from the magnitude of the dispersion. A reliability determining and correcting unit 17 first makes a loss decision based on the reliability information and then carries out a correction on the magnitude of deviation of pre-demapping data in proportion to how low the reliability is.

A diversity circuit 50 compares the reference points closest to the frequency-base data, which are specified by the first data of pre-demapping data, and, if they agree with each other, selects and outputs the pre-demapping data of this reference point. If they do not agree with each other, the diversity circuit 50 compares the reliability information, and selects and outputs the input pre-demapping data with higher reliability. If a single output can not be chosen by either reference point comparison or reliability comparison, then the diversity circuit 50 selects and outputs any one of the input pre-demapping data. The subsequent processings are the same as in the fifth to eighth embodiments.

Tenth Embodiment

A receiving apparatus 600 according to a tenth embodiment has the structure and operation in common with those in the ninth embodiment except for the processing by a diversity circuit 50. When a single output can not be chosen by either reference point comparison or reliability comparison, the diversity circuit 50 according to this tenth embodiment regards it as a loss of received data and outputs data indicating to the effect that the received data is lost. This structure raises the reliability of data as a whole by erasing data of unknown reliability.

Eleventh Embodiment

A receiving apparatus according to an eleventh embodiment differs from the seventh to tenth embodiments in that it has a function of detecting reliability information in two ways, namely, detection by SP and detection by the dispersion of deviation of pre-demapping. The processing by first and second demodulators 16 and 36, however, are in common with that in the seventh and eighth embodiments. The processing by first and second pre-demapping units 19 and 39 and the processing by first and second reliability detectors 20 and 40 are in common with those in the ninth and tenth embodiments. First and second reliability determining units 21 and 41 first make a loss decision based on the reliability information and then carry out a correction on the magnitude of deviation of pre-demapping data in proportion to how low the reliability is. Both the loss decision and correction are carried out using both the reliability information by SP and the reliability information by the dispersion of deviation.

A diversity circuit 50 compares the reference points closest to the frequency-base data, which are specified by the first data of pre-demapping data, and, if they agree with each other, selects and outputs the pre-demapping data of this reference point. If they do not agree with each other, the diversity circuit 50 first compares the reliability information by SP, and selects and outputs the input pre-demapping data with higher reliability. If received data with higher reliability can not be chosen uniquely, the diversity circuit 50 then compares the reliability information by the dispersion of deviation, and selects and outputs the input pre-demapping data with higher reliability. And if a single output can not be chosen by any of the above methods, the diversity circuit 50 selects and outputs any one of the input pre-demapping data. The subsequent processings are the same as in the fifth to tenth embodiments.

Twelfth Embodiment

A receiving apparatus according to an eleventh embodiment has the structure and operation in common with those in the eleventh embodiment except for the processing by a diversity circuit 50. When a single output can not be chosen by either reference point comparison or the two ways of reliability comparison, the diversity circuit 50 according to this eleventh embodiment regards it as a loss of received data and outputs data indicating to the effect that the received data is lost. This structure raises the reliability of data as a whole by erasing data of unknown reliability.

Thirteenth Embodiment

A receiving apparatus according to a thirteenth embodiment has the structure and operation in common with those in the eleventh and twelfth embodiments except for the processing by a diversity circuit 50. In the diversity circuit 50 according to this thirteenth embodiment, the order of the two ways of reliability comparison is reversed; that is, the comparison of reliability information by the dispersion of deviation is done earlier than the reliability comparison by SP. The other structures and operations are the same as in the eleventh and twelfth embodiments.

The present invention has been described based on several embodiments which are only exemplary. It is understood by those skilled in the art that there exist other various modifications to the combination of each component and process described above and that such modifications are encompassed by the scope of the present invention. An example of such modifications will be described hereinbelow.

Though the data reception by the OFDM method has been described in the above embodiments, the present invention is also applicable, as modified examples, to other modulation methods in which the constellation can be displayed.

Although the present invention has been described by way of exemplary embodiments, it should be understood that many changes and substitutions may be made by those skilled in the art without departing from the scope of the present invention which is defined by the appended claims.

What is claimed is:
1. A diversity receiving apparatus, including:
  a data receiving unit, provided on each of diversity branches, which receives a data;
  a reference point computing unit, provided on each of the branches, which calculates a reference point on a constellation for a data received by the data receiving unit provided on each of the branches;

a reference point specifying unit, provided on each of the branches, which specifies a reference point in the branch by selecting a reference point on a constellation closest to the received data; and a reference point outputting unit which outputs a data indicating a coinciding reference point, when reference points specified in each reference point specifying unit coincide.

2. A diversity receiving apparatus according to claim 1, wherein, the apparatus selects and outputs a data received by one of the data receiving units at random, when reference points specified in each reference point specifying unit do not coincide.

3. A diversity receiving apparatus according to claim 1, wherein, the apparatus regards the received data as being lost, when reference points specified in each reference point specifying unit do not coincide.

4. A diversity receiving apparatus according to claim 1, wherein the apparatus detects a reliability information for each of the branches based on a dispersion of a scattered pilot (SP) using an SP signal included in a pilot signal inserted in an OFDM symbol, and outputs a data having the higher reliability when reference points specified in each reference point specifying unit do not coincide.

5. A diversity receiving apparatus according to claim 1, wherein the apparatus detects a reliability information for each of the branches based on a dispersion of the deviation between a received data and a reference point on a constellation closest the received data, and outputs a data having the higher reliability when reference points specified in each reference point specifying unit do not coincide.

6. A diversity receiving apparatus according to claim 1, wherein the apparatus
  detects a first reliability information for each of the branches based on a dispersion of a scattered pilot (SP) using an SP signal included in a pilot signal inserted in an OFDM symbol,
  detects a second reliability information for each of the branches based on a dispersion of a deviation between a received data and he reference point on a constellation closest the received data,
  compares the first reliability information detected in each of the branches, and determines the information having the higher one as a first higher information,
  compares the second reliability information detected in each of the branches, and determines the information having the higher one as a second higher information,
  outputs either the first or the second higher information with a given priority, and when either the first or the second higher information cannot be determined, then outputs the information which can be determined, when reference points specified in each reference point specifying unit do not coincide.

* * * * *